United States Patent Office 3,155,470
Patented Nov. 3, 1964

3,155,470
PROCESS FOR THE SEPARATION OF SUSPENDED PARTICLES FROM GASES
Ernst Götte, Dusseldorf-Oberkassel, and Alfred Kirstahler, Dusseldorf, Germany, assignors to Bohme Fettchemie G.m.b.H., Dusseldorf, Germany, a corporation of Germany
No Drawing. Filed Oct. 13, 1960, Ser. No. 62,340
Claims priority, application Germany Oct. 31, 1959
4 Claims. (Cl. 55—97)

This invention relates to a process for the removal of solid and liquid particles from the gases in which the said particles are suspended. The process more particularly relates to contacting gases containing solid and liquid particles suspended therein with liquid alkylene oxide condensation products to bind said particles with the said liquid alkylene oxide condensation products.

Prior to the present invention, various materials have been used to remove suspended liquid and solid particles from the gases, but they were not satisfactory. For example, drilling oil emulsions have been used to coat filtering surfaces to improve removal of suspended particles from gases, but the drilling oil emulsions are difficult to remove from the filter walls or materials, thereby complicating the cleaning of the filters. It was necessary to clean the filters with the aid of washing agents to remove the drilling oil emulsions laden with the suspended particles before the filters could be recoated with the drilling oil emulsion.

The addition of various wetting agents as emulsifiers for the drilling oil emulsions to facilitate the removal of the dust layer when washing with water has been attempted. Anion-active and cation-active substances were found to be unsatisfactory due to the formation of excess foam during cleaning of the filter, particularly in self-cleaning circulating filters, and the oily layer was not satisfactorily removed. Also, the anion-active and cation-active additives are unsuitable for use in electrofilters because they possess a relatively high electrical conductivity which interferes with the particle removal, making it impossible in some instances. Non-ionic additives are not useful since they also foam strongly.

It is an object of the invention to provide a novel process for the removal of suspended liquid and solid particles from gases by contacting said gases containing said suspended particles with a liquid alkylene oxide condensation product having the formula

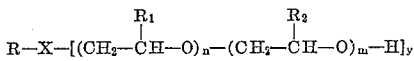

and

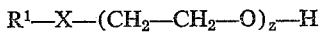

wherein R is selected from the group consisting of alkyl phenyl and alkyl naphthyl, the alkyl groups having 4–10 carbon atoms, and aliphatic hydrocarbon radicals containing 8–18 carbon atoms, R¹ is a hydrocarbon radical of 12–18 carbon atoms or an alkyl phenyl radical with 3–15 carbon atoms in the alkyl residue, X is selected from the group consisting of

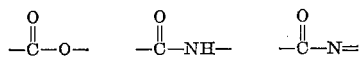

—N=, —O—, —S— and —SO$_2$NH—, R$_1$ and R$_2$ being selected from the group consisting of hydrogen and methyl and R$_1$ and R$_2$ being different, $n$ is an integer from 3–15, $m$ is an integer from 1–17, $y$ is 1 with the proviso that $y$ is 2 when X is

or —N= and Z is an integer from 8 to 30 and having low foaming properties.

It is a further object of the invention to provide a novel process for removing from gases liquid and solid particles suspended therein by passing said gases through mechanical or electrofilters in which the filtering surfaces are coated with said alkylene oxide condensation products.

It is another object of the invention to provide a novel process for removing from gases liquid and solid particles suspended therein by passing said gases through spray or wet scrubbers in which the water contains said alkylene oxide condensation products.

It is another object of the invention to provide a novel process for removing from gases liquid and solid particles suspended therein by atomizing said alkylene oxide condensation products in the gases to bind the suspended particles.

These and other objects and advantages of the invention will become clear from the following detailed description.

The process of the invention comprises contacting gases having solid and liquid particles suspended therein with liquid alkylene oxide condensation products which have low or no foaming properties whereby the suspended particles are bound to the alkylene condensation products and removed from the gases. The suspended particles may be contacted with the alkylene condensation products in many ways, such as passing the particle-containing gases through mechanical or electrofilters which are coated with a film of the alkylene oxide condensation products, or by passing the particle containing gases through wet or spray scrubbers in which the water contains alkylene oxide condensation products.

The liquid alkylene oxide condensation products useful in the process are products having the formulas

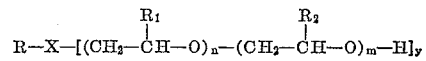

and

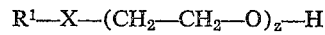

wherein R is selected from the group consisting of alkyl phenyl and alkyl naphthyl, the alkyl groups having 4–10 carbon atoms, and aliphatic hydrocarbon radicals containing 8–18 carbon atoms, R¹ is a hydrocarbon radical of 12–18 carbon atoms, X is selected from the group consisting of

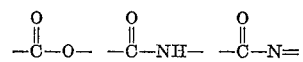

—N=, —O—, —S— and —SO$_2$NH—, R$_1$ and R$_2$ are selected from the group of hydrogen and methyl with R$_1$ and R$_2$ being different, $n$ is an integer from 3–15, $m$ is an integer from 1–17, $y$ is 1 with the proviso that $y$ is 2 when X is

or —N= and Z is an integer from 8 to 30 and having low foaming properties.

Examples of ethylene oxide-propylene oxide condensation products having alkyl aryl groups are the product resulting from the condensation of 5 to 10 mols of propylene oxide with the condensation product of 1 mol of nonyl phenol and 9 mols of ethylene oxide, the product resulting from the condensation of 9 to 12 mols of propylene oxide with the condensation of 1 mol of nonyl alcohol and 12 mols of ethylene oxide, the product resulting from the condensation of 13 to 17 mols of propylene oxide with the condensation product of 1 mol of nonyl phenol and 15 mols of ethylene oxide and the product resulting from the condensation of 4 mols of propylene oxide to the condensation product of 1 mol of nonyl phenol and 4 mols of ethylene oxide. The alkyl aryl radical may be other than nonyl phenol such as hexyl phenol, hexyl phenyl thiol, butyl benzoic acid and decyl amine.

Examples of compounds that are useful in accordance with the invention are the products obtained by condensing 10 to 14 mols of propylene oxide with condensation products of aliphatic alcohols with 12 to 14 carbon atoms and 9 mols of ethylene oxide, by condensation of 9 to 14 mols of propylene oxide with condensation products of aliphatic alcohols with 12 to 14 carbon atoms and 9 mols of ethylene oxide, and by condensation of 7 to 13 mols of propylene oxide with condensation products of alcohols with 12 to 14 carbon atoms and 7 mols of ethylene oxide. In place of the alkoxylation products of the above high molecular hydroxyl compounds, the corresponding ethoxylation products of high molecular carboxylic acids, amines, mercaptans, carboxylic acid amides, sulfonic acid amides are condensed with propylene oxide to form products useful in this invention.

The above described products are generally characterized in that they are readily soluble in water at normal temperature, that they do not form foaming aqueous solutions, and that they separate out of the aqueous solutions in the form of oil films. These properties are exhibited by the above products to an excellent degree. Products in which the addition of the ethylene oxide chain and the propylene oxide chain has been effected in reverse sequence and products which contain merely ethylene oxide radicals and in which the chain length of the hydrocarbon radical of the initial compounds and the chain length of the ethylene oxide radical are selected in such a way that products having the above properties are obtained are useful in the invention. Examples of suitable addition products wherein the alkylene oxide groups have been added in reverse sequence are products which have been obtained by adding 9 to 12 mols ethylene oxide to addition products of 1 mol nonyl phenol and 9 mols propylene oxide and by addition of 8 to 12 mols ethylene oxide to addition products of 1 mol of a fatty alcohol mixture with 12 to 14 carbon atoms and 9 mols propylene oxide. Further examples of suitable compounds for the invention are disclosed in applicants' copending United States application Serial No. 46,091, filed July 29, 1960.

The use of the liquid alkylene oxide condensation products in dust removal apparatus with mechanical filters facilitates the cleaning and re-impregnation of the filters considerably and makes these operations more economical. Particularly advantageous in connection herewith is the lime-resistance and electrolyte-resistance of the above mentioned products so that any available type of tap water can be used without having to fear undesirable deposits. Above all, the products employed in accordance with the invention do not develop any foam and do not cause any corrosion of the structural parts of the filters.

Preliminary filters and electrofilters of a dust-removing apparatus are thoroughly rinsed with a cold 10% solution of the above-mentioned liquid alkylene oxide condensation products at normal temperature and are subsequently dried. An oily film is formed thereby on the filter surfaces which does not interfere with the dust removal under customary conditions in electrofilters, for example, at 9000 volts and 8 mm. distance between electrodes. The trapped dust firmly adheres to this oil film, so that a very effective scrubbing of air can be achieved thereby. After the filter is contaminated with separated dust, it may be cleaned in a simple fashion by merely rinsing it with water. Subsequent to the cleaning operation, the new oil film is applied without intermediate drying, from a 10% cold, aqueous solution. If working with warm solutions is desired, the concentration of addition products in the aqueous solutions can be reduced because the oily phase separates out adequately within a higher temperature range from less concentrated solutions, whereby a more advantageous utilization of the effective substances results.

In practical operation, the cleaning procedures as well as the impregnating procedure of the filters may be accomplished with the aid of spray nozzles by first washing off the contaminated film with water and thereafter applying the new oil film without interruption, by feeding the required amount of addition product into the spraying water by means of a suitable dosing device. By using warm water for spraying the oil film onto the filter, the process may be rendered more economical. Furthermore, it is also possible to atomize the solutions of these addition products in the filter chamber in order to achieve a binding of the floating dust particles which then also deposit themselves upon the filter surfaces or filter materials.

The amounts or conditions under which the products may be used are variable. Aqueous solutions with a content of 5 to 20% of the addition products may be employed. The operation conditions of the filters, especially those of the electrofilters, are not changed.

The employment of the condensation products is not limited to the use in filtering devices; they may also be employed in other industrial devices intended for removal of dust and any other suspended industrial particles, for example, in respirator masks or filters. Furthermore, it is possible to use the alkylene oxide condensation products in those cases where heretofore dust-removing paint coatings have been used, such as in paint shops. They have the advantage that they are easier to remove and do not require the use of expensive and possibly flammable solvents. Another use is in wet and spray scrubbers wherein the water contains the alkylene oxide condensation products.

In the following examples there are described several preferred embodiments to illustrate the invention. However, it should be understood that the invention is not intended to be limited to the specific embodiments.

*Example 1*

The preliminary filter of a dust removing device was impregnated with the product resulting from the condensation of 12 mols of propylene oxide with the condensation product of 1 mol of nonyl phenol and 9 mols of ethylene oxide by spraying the filter with a 3 to 5% aqueous solution of said condensation product at a temperature of 10° C. After impregnation, the filter was heated to a temperature above the dehydration temperature of the alkylene oxide condensation product and a dust-binding, oily coating was formed on the filter. After a period of use, the filter was contaminated with dust particles from the air passing through it. The filter was cleaned by rinsing with cold water and after impregnating again was suitable for reuse.

Similar results were obtained when the alkylene oxide condensation product in the above process was replaced with the products (1) resulting from the condensation of 17 mols of propylene oxide with the condensation product of 1 mol of a mixture of fatty alcohols derived from coconut oil and 9 mols of ethylene oxide; (2) resulting from the condensation of 16 mols of propylene oxide with the condensation product of 1 mol of a mixture of amines derived from coconut oil and 10 mols of ethylene oxide; (3) resulting from the condensation of 15 mols of propylene oxide with the condensation product of 1 mol of a mixture of fatty alcohols derived from coconut oil and 7 mols of ethylene oxide; and (4) resulting from the condensation of 16 mols of propylene oxide with the condensation product of 1 mol of diethanol amide of fatty acids obtained from coconut oil and 10 mols of ethylene oxide. The said condensation products were effective dust binders and were easily removed by rinsing with cold water.

When the filter was sprayed at 30° C., the aqueous solution of the following alkylene oxide condensation products produced equal results: (1) the condensation product of 7 mols of propylene oxide with the condensation product of 6 mols ethylene oxide and 1 mol of nonyl phenol; (2) the condensation product of 11 mols of propylene oxide with the condensation product of 1 mol of a coconut oil fatty alcohol mixture and 9 mols of ethylene oxide; (3) the condensation product of 11 mols of propylene oxide to the condensation product of 1 mol of a coconut oil amine mixture and 10 mols of ethylene oxide; (4) the condensation product of 8 mols of propylene oxide with the condensation product of 7 mols of ethylene oxide and 1 mol of coconut oil fatty alcohol mixture; (5) the condensation product of 10 mols of propylene oxide with the condensation product of 10 mols of ethylene oxide and 1 mol of the diethanol amide of long chain fatty acids derived from coconut oil.

The above mentioned alkylene oxide condensation products may be combined with ethylene oxide addition products in order to increase the wetting effect of the solutions. Amounts up to 100%, based on the amount of alkylene oxide condensation products, of the ethylene oxide addition products may be used. Examples of such additives are the following products: (1) the condensation product of 15 mols of ethylene oxide with 1 mol of nonyl phenol; (2) the condensation product of 30 mols of ethylene oxide with 1 mol of nonyl phenol; (3) the condensation product of 30 mols of ethylene oxide with 1 mol of dodecyl phenol; (4) the condensation product of 20 mols of ethylene oxide with 1 mol of a coconut oil fatty alcohol mixture.

*Example II*

In a scrubbing device in which dust containing air is washed in wet scrubbers with water, 0.2 to 0.6 gram of a mixture of 2 parts of the product resulting from the condensation of 10 mols of propylene oxide with the condensation product of 1 mol of nonyl phenol and 9 mols of ethylene oxide and 1 part of the product resulting from the condensation of 20 mols of ethylene oxide and 1 mol of nonyl phenol were added to each liter of water in the wet scrubber. The dust was rapidly removed from air and a better removal of odorous particles was achieved. Deposits of the particles on the walls of the scrubber and in the immersion tubes was avoided and stoppages to clean the water were avoided because the dust did not form layers on the surface of the water.

*Example III*

The effectiveness of the alkylene oxide condensation products of Example I for use in dust removal spray scrubbers was tested by injecting 0.5 gram of the condensation products per liter of water. An oily film formed on the spray liquid and was particularly effective in removing dust, and was washed out easily with cold water. When hot water was used in the spray device, up to 5 grams of alkylene oxide condensation product per liter of water could be used.

Various modifications of the process of the present invention may be made without departing from the spirit or scope thereof, and it is to be understood that the invention be limited only as defined in the appended claims.

We claim:

1. Process for the dry separation of suspended liquid and solid particles from gases comprising contacting gases containing liquid and solid particles suspended therein with a dry type mechanical gas filter having deposited thereon as a sole filtering medium a water-soluble liquid alkylene oxide condensation product having low foaming properties and having the formula

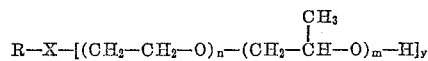

wherein R is selected from the group consisting of alkylphenyl and alkylnaphthyl, wherein the alkyl groups contain 4 to 10 carbon atoms, and an aliphatic hydrocarbon radical having 8 to 18 carbon atoms, X is selected from the group consisting of

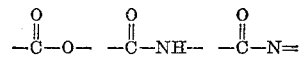

—O—, —S—, —N= and —SO$_2$NH—, $y$ is 1 with the proviso that when X is selected from the group consisting of

and —N=, $y$ is 2, $n$ is an integer from 3 to 15 and $m$ is an integer from 1 to 17 whereby the said suspended particles are bound with the said alkylene oxide condensation product and removing the gas free of suspended particles from the dry filter.

2. The process of claim 1 wherein the liquid alkylene oxide condensation product is the product resulting from the condensation of 12 mols of propylene oxide with the condensation product of 1 mol of nonyl phenol and 9 mols of ethylene oxide.

3. The process of claim 1 wherein the liquid alkylene oxide condensation product is a mixture of 2 parts of the product resulting from the condensation of 10 mols of propylene oxide with the condensation product of 1 mol of nonyl phenol and 9 mols of ethylene oxide and 1 part of the product resulting from the condensation of 1 mol of nonyl phenol and 20 mols of ethylene oxide.

4. The process of claim 1 wherein the liquid alkylene oxide condensation product is the product resulting from the condensation of 10 mols of propylene oxide with the condensation product of 1 mol of a diethanol amide of long chain fatty acids derived from coconut oil and 10 mols of ethylene oxide.

References Cited in the file of this patent

UNITED STATES PATENTS

| | | |
|---|---|---|
| 1,970,578 | Schoeller et al. | Aug. 21, 1934 |
| 2,002,613 | Orthner et al. | May 28, 1935 |
| 2,576,913 | Baird et al. | Dec. 4, 1951 |
| 2,579,984 | Trowbridge | Dec. 25, 1951 |
| 2,789,093 | Foehr | Apr. 16, 1957 |

FOREIGN PATENTS

| | | |
|---|---|---|
| 538,843 | Canada | Mar. 26, 1957 |
| 584,180 | Canada | Sept. 29, 1959 |

OTHER REFERENCES

Schwartz et al.: Surface Active Agents and Detergents, vol. II, N.Y., Interscience Publishers, July 1958, p. 121, TP 149S3C.7.